United States Patent
Goto et al.

(10) Patent No.: US 11,114,923 B2
(45) Date of Patent: Sep. 7, 2021

(54) BENDING-FORMING JIG

(71) Applicants: TOYOTA JIDOSHA KABUSHIKI KAISHA, Toyota (JP); DENSO CORPORATION, Kariya (JP)

(72) Inventors: Yuiki Goto, Toyota (JP); Daisuke Mizushima, Toyota (JP); Yasuyuki Hirao, Okazaki (JP); Hiroaki Takeda, Kariya (JP); Sho Yasuda, Kariya (JP)

(73) Assignees: TOYOTA JIDOSHA KABUSHIKI KAISHA, Toyota (JP); DENSO CORPORATION, Kariya (JP)

(*) Notice: Subject to any disclaimer, the term of this patent is extended or adjusted under 35 U.S.C. 154(b) by 126 days.

(21) Appl. No.: 16/566,256

(22) Filed: Sep. 10, 2019

(65) Prior Publication Data

US 2020/0091800 A1 Mar. 19, 2020

(30) Foreign Application Priority Data

Sep. 14, 2018 (JP) .............................. JP2018-172187

(51) Int. Cl.
*H02K 15/00* (2006.01)
*B21K 23/00* (2006.01)

(52) U.S. Cl.
CPC ......... *H02K 15/0031* (2013.01); *B21K 23/00* (2013.01); *Y10T 29/53157* (2015.01); *Y10T 29/53161* (2015.01)

(58) Field of Classification Search
CPC ........ Y10T 29/53157; Y10T 29/53161; H02K 15/0031
See application file for complete search history.

(56) References Cited

U.S. PATENT DOCUMENTS

| | | | | | |
|---|---|---|---|---|---|
| 1,690,336 | A | * | 11/1928 | Elsey | ..................... B21D 11/10 |
| | | | | | 72/312 |
| 1,703,188 | A | * | 2/1929 | Elsey | ..................... H02K 13/04 |
| | | | | | 72/383 |

(Continued)

FOREIGN PATENT DOCUMENTS

| JP | 2004236375 A | * | 8/2004 |
|---|---|---|---|
| JP | 2004320848 A | * | 11/2004 |

(Continued)

OTHER PUBLICATIONS

English Translation of JP 2004-236375 A (Year: 2004).*
U.S. Appl. No. 16/369,391, filed Mar. 29, 2019 to Mizushima et al.

*Primary Examiner* — Jason L Vaughan
(74) *Attorney, Agent, or Firm* — Sughrue Mion, PLLC

(57) ABSTRACT

A bending-forming jig used in bending and forming a protruding portion of a leg portion of a U-shaped conductor toward a circumferential direction, the protruding portion protruding from an axial end surface of a stator core, the bending-forming jig including a ring portion and a claw portion, the claw portion including a first abutting surface that rises from an axial end surface of the ring portion with the surface directed in the circumferential direction and abuts against a tip portion of the protruding portion from the circumferential direction, and a projecting portion that projects, at a tip end of the claw portion, in the circumferential direction from the abutting surface and abuts against the tip portion of the protruding portion from the axial direction toward the axial end surface of the ring portion.

4 Claims, 13 Drawing Sheets

(56) References Cited

U.S. PATENT DOCUMENTS

| | | | | |
|---|---|---|---|---|
| 2,199,623 A * | 5/1940 | Elsey | ................ | H02K 15/0012 |
| | | | | 29/736 |
| 6,519,993 B2 * | 2/2003 | Even | ................ | H02K 15/0037 |
| | | | | 29/596 |
| 9,350,218 B2 * | 5/2016 | Kubota | ................ | H02K 1/187 |
| 10,587,171 B2 * | 3/2020 | Onda | ................ | H02K 15/0087 |
| 2009/0001841 A1 * | 1/2009 | Naganawa | ............... | H02K 3/12 |
| | | | | 310/207 |
| 2017/0126106 A1 | 5/2017 | Mizushima et al. | | |

FOREIGN PATENT DOCUMENTS

| | | | |
|---|---|---|---|
| JP | 2004328861 A | * | 11/2004 |
| JP | 2006304507 A | * | 11/2006 |
| JP | 2017-085806 A | | 5/2017 |

* cited by examiner

BENDING-FORMING JIG

CROSS REFERENCE TO RELATED APPLICATION

This application claims priority to Japanese Patent Application No. 2018-172187 filed on Sep. 14, 2018, which is incorporated herein by reference in its entirety including the specification, claims, drawings, and abstract.

TECHNICAL FIELD

The present disclosure relates to a structure of a bending-forming jig used in bending and forming protruding portions of a U-shaped conductor inserted in slots of a stator core.

BACKGROUND

A method used to form a stator coil includes inserting a U-shaped conductor (segment coil) into slots of a stator core; bending and forming, in the circumferential direction, protruding portions protruding from the axial end surface of the stator core; and welding between tip portions of the radially adjacent protruding portions.

Welding between the tip portions is performed by laser welding, and at this time, the positions of the radially adjacent tip portions are required to be aligned in the axial direction and the circumferential direction. To this end, there has been proposed a method of performing welding with the axial and circumferential positions of the tip portions held using an alignment jig, and the tip portions fixed in the radial direction using a pressing jig (for example, see JP 2017-85806 A).

SUMMARY

Meanwhile, a method that has been used in recent years is welding the tip portions by aligning the positions of the tip portions after bending and forming in the axial direction and the circumferential direction to an extent that can enable welding, and fixing the tip portions only in the radial direction using a pressing jig. The height of a coil end protruding from the axial end surface of the stator core is also required to be lowered to reduce the size of a motor. To lower the height of the coil end, it is necessary to increase the amount of bending of the protruding portions of the U-shaped conductor and lower the height of the tips of the protruding portions. However, when the amount of bending of the U-shaped conductor is increased, the bending load may bend the tips of the protruding portions. In this case, a step may be formed on the axial end surfaces of the tip portions after bending and forming, and local heating during laser welding may cause spattering.

In consideration of this, an object of the present disclosure is to provide a bending-forming jig that can prevent the tip portions from being bent when the U-shaped conductor inserted in the slots of the stator core is bent and formed.

A bending-forming jig of the present disclosure is a bending-forming jig used in bending and forming a protruding portion of a leg portion of a U-shaped conductor toward the circumferential direction, the U-shaped conductor being inserted in slots of a stator core, the protruding portion protruding from an axial end surface of the stator core, the bending-forming jig including an annular ring portion and a claw portion that protrudes in the axial direction from an axial end surface of the ring portion, wherein the claw portion includes an abutting surface that rises in the axial direction from the axial end surface of the ring portion with the surface directed in the circumferential direction and abuts against a tip portion of the protruding portion from the circumferential direction when the protruding portion is bent and formed, and a projecting portion that projects, at a tip end of the claw portion, in the circumferential direction from the abutting surface and abuts against the tip portion of the protruding portion from the axial direction toward the axial end surface of the ring portion when the protruding portion is bent and formed.

The present disclosure can provide a bending-forming jig that can prevent the tip portions from being bent when the U-shaped conductor inserted in the slots of the stator core is bent and formed.

BRIEF DESCRIPTION OF DRAWINGS

Embodiments of the present disclosure will be described based on the following figures, wherein.

DESCRIPTION OF EMBODIMENTS

Figure 1:
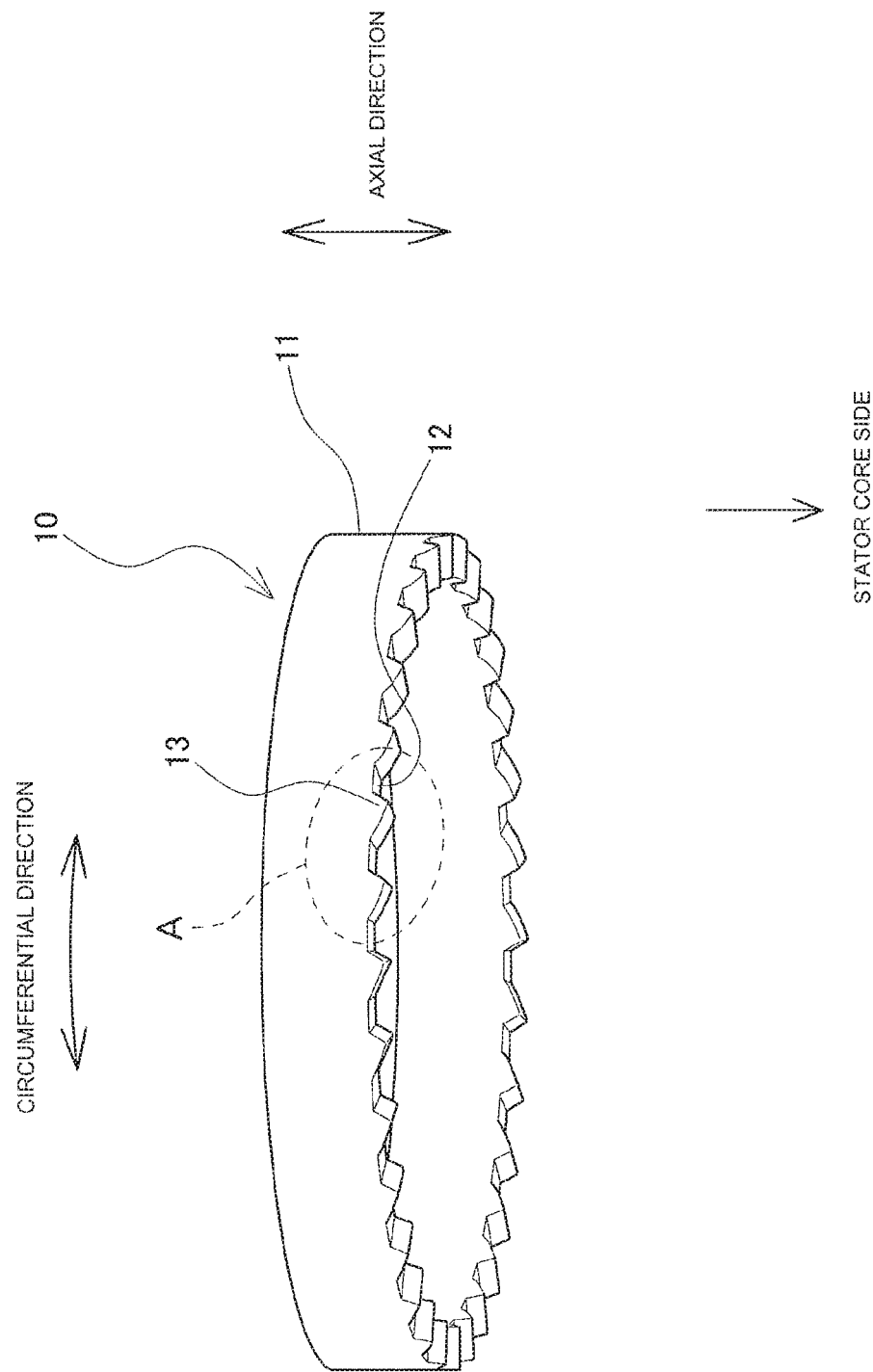
FIG. 1 is a perspective view showing a bending-forming jig according to an embodiment.

Hereinafter, a bending-forming jig 10 according to an embodiment will be described with reference to the drawings. As shown in FIG. 1, the bending-forming jig 10 includes an annular ring portion 11, and claw portions 13 protruding in the axial direction from an axial end surface 12 of the ring portion 11.

Figure 2:
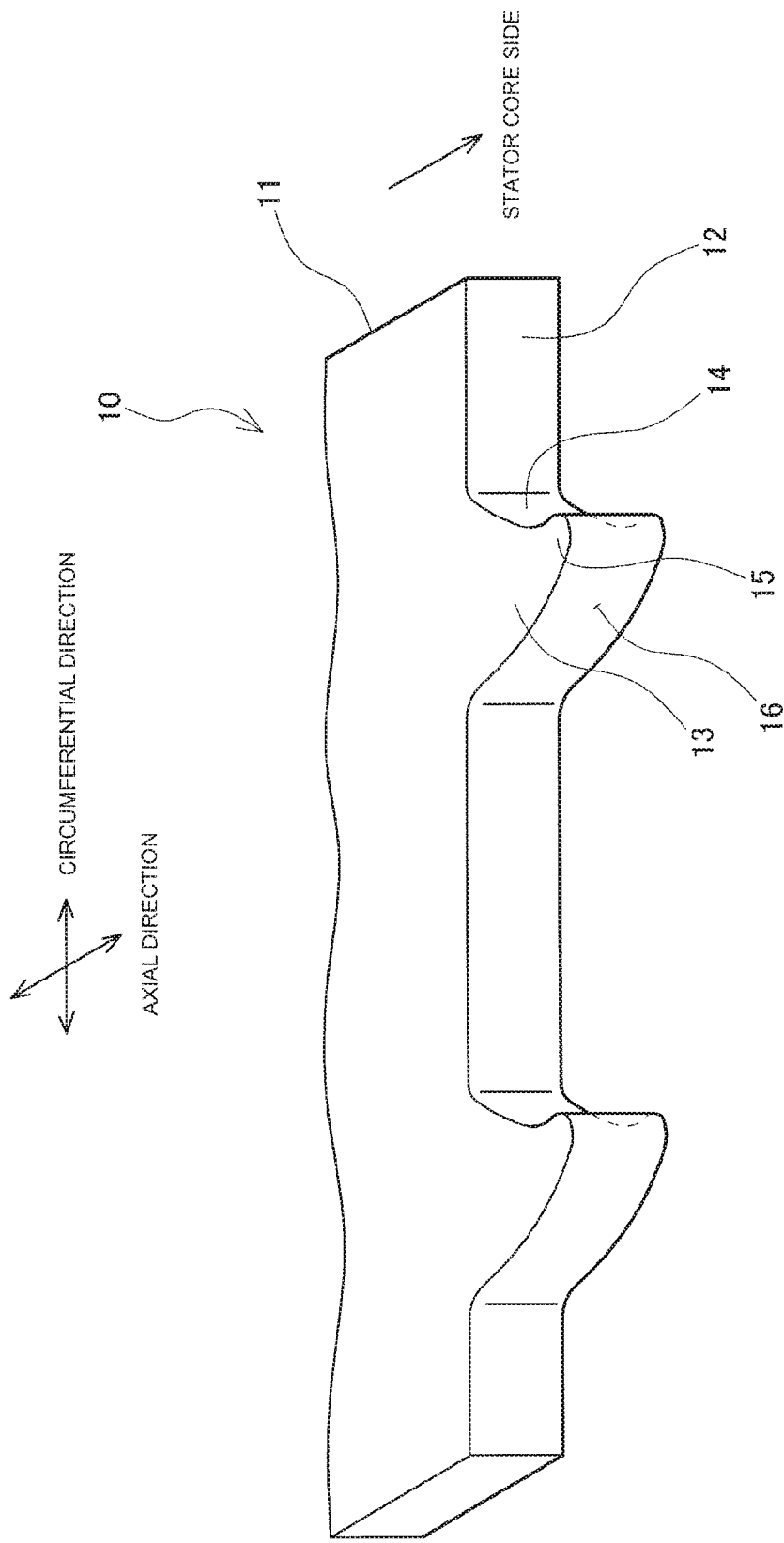
FIG. 2 is a detailed perspective view of Part A in FIG. 1.

As shown in FIG. 2, the claw portion 13 includes a first abutting surface 14 that rises in the axial direction from the axial end surface 12 of the ring portion 11 with the surface directed in the circumferential direction, and a hook-shaped projecting portion 15 that projects, at the tip end of the claw portion 13, in the circumferential direction from the first abutting surface 14. As described below, the first abutting surface 14 is a surface which abuts against a tip portion 33 of a protruding portion 32 of a U-shaped conductor 30 from the circumferential direction when the protruding portion 32 is bent and formed in the manufacturing process of a stator coil 25 shown in FIG. 4. In addition, the projecting portion 15 is a portion which abuts against the tip portion 33 of the protruding portion 32 from the axial direction toward the axial end surface 12 of the ring portion 11 when the protruding portion 32 of the U-shaped conductor 30 is bent and formed in the manufacturing process of the stator coil 25.

In addition, the claw portion 13 includes a second abutting surface 16 that rises from the axial end surface 12 of the ring portion 11 with the surface directed to the opposite side to the first abutting surface 14 in the circumferential direction. Like the first abutting surface 14, the second abutting surface 16 is also a surface which abuts against the tip portion 33 of the protruding portion 32 from the circumferential direction when the protruding portion 32 of the U-shaped conductor 30 is bent and formed.

The outline of the steps of manufacturing the stator coil 25 will now be described with reference to FIGS. 3 and 4.

Figure 3:
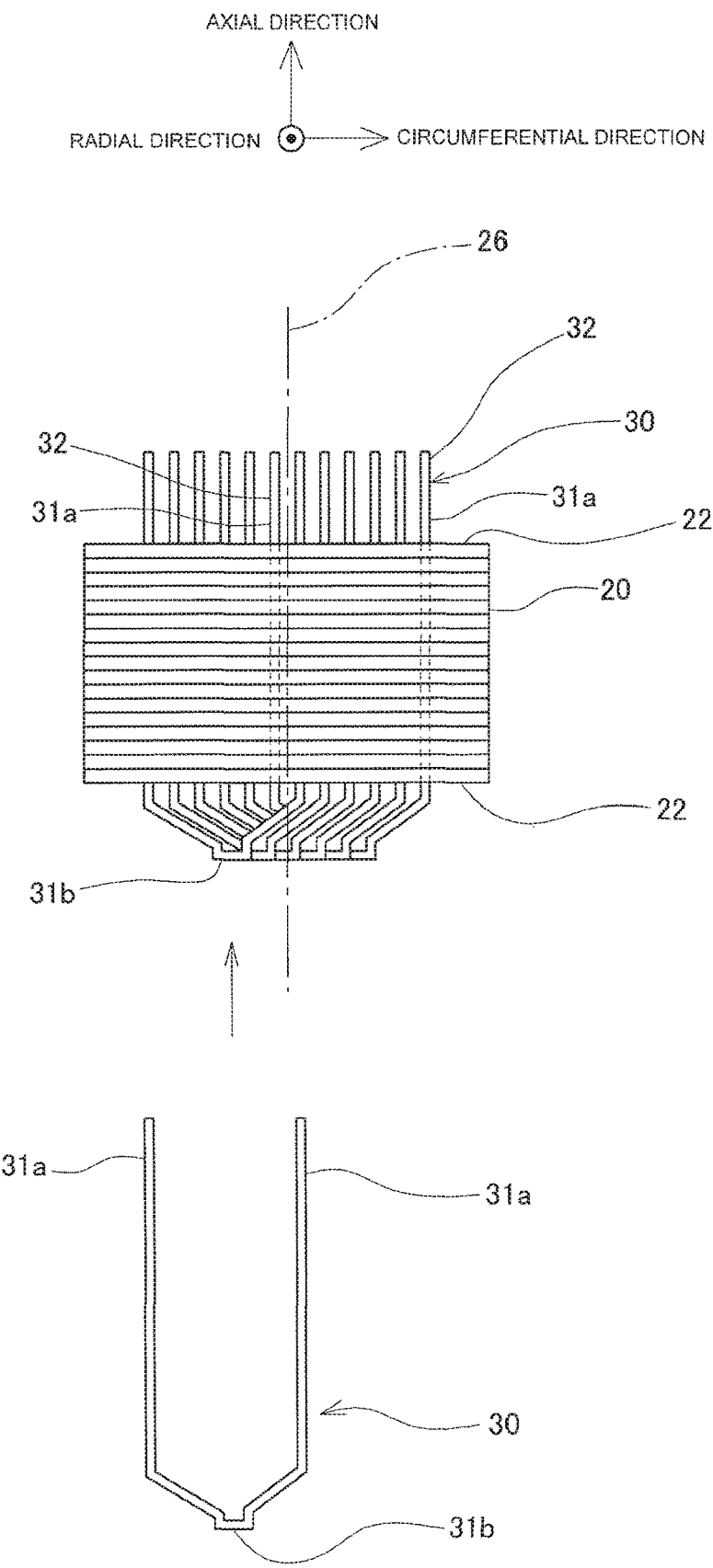
FIG. 3 illustrates the step of inserting a U-shaped conductor into slots of a stator core.
Figure 4:
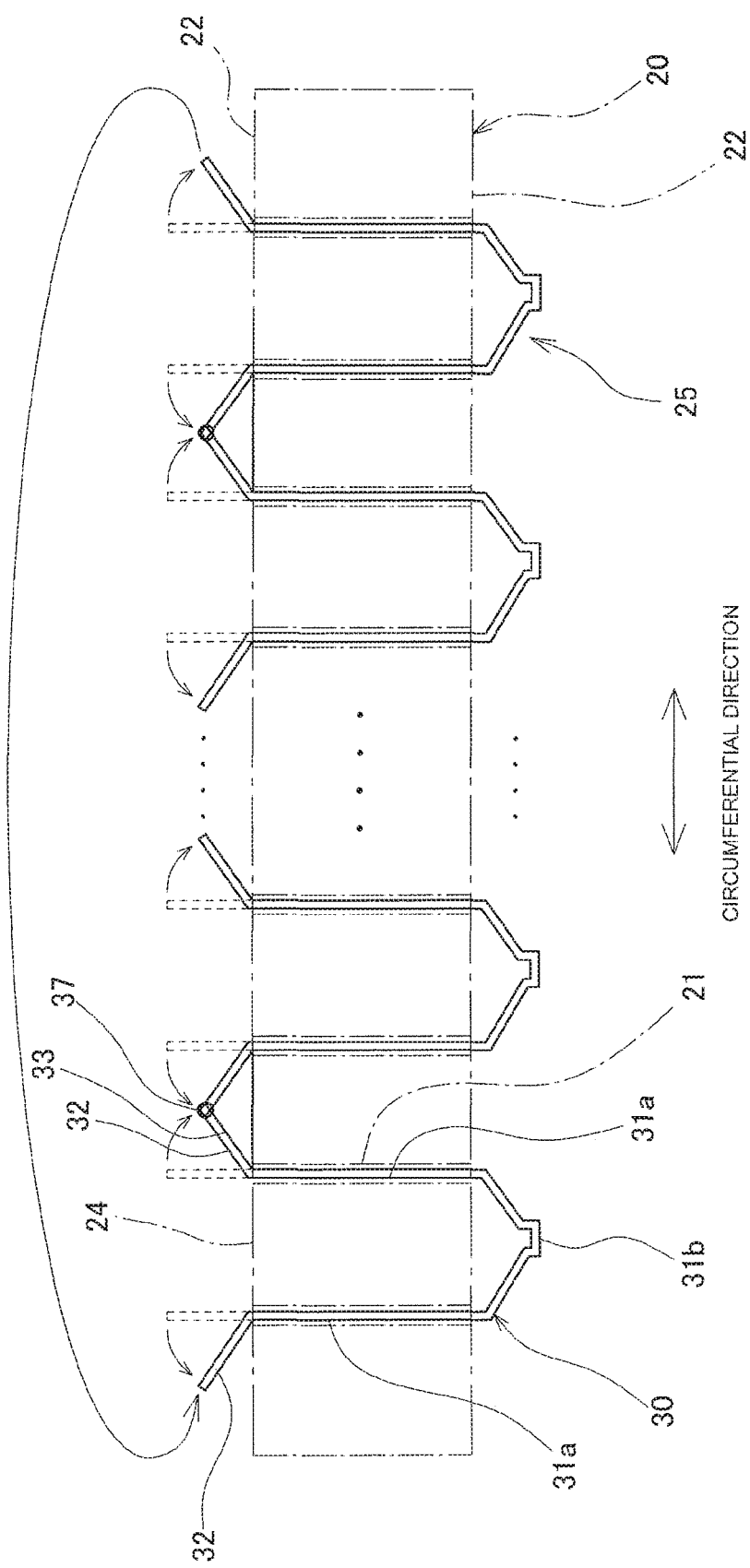
FIG. 4 is a circumferential developed view of a stator coil formed by bending protruding portions of the U-shaped conductors and welding tip portions of the protruding portions.
Figure 5:
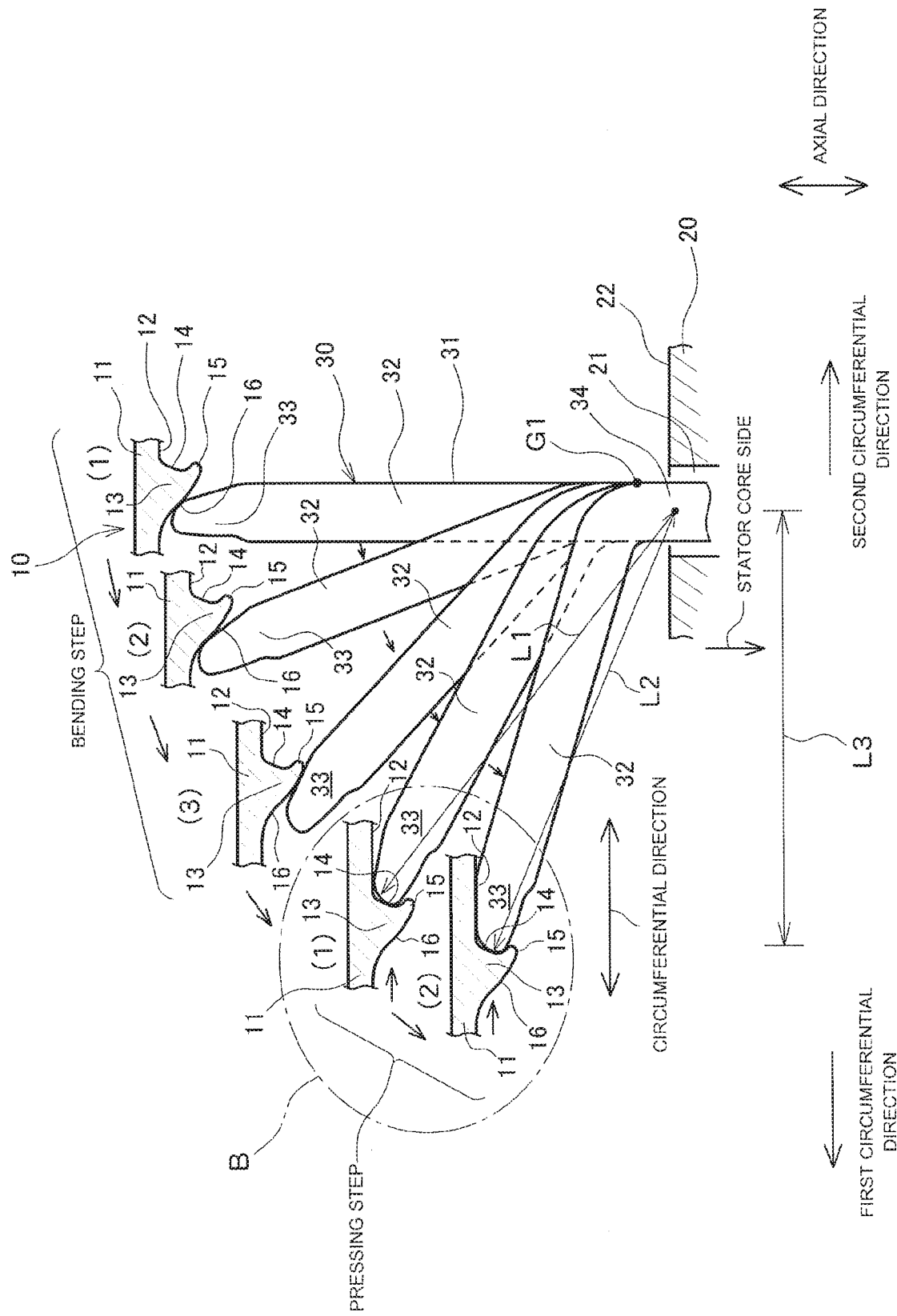
FIG. 5 illustrates the step of bending and forming the protruding portion of the U-shaped conductor by means of the bending-forming jig according to the embodiment.

First, as shown in FIG. 3, the U-shaped conductor 30 obtained by forming a rectangular wire into a U shape is inserted in slots 21 of the stator core 20 (see FIGS. 4 and 5). As shown in FIG. 3, the U-shaped conductor 30 is composed of two leg portions 31a that are parallel to each other and a connecting portion 31b that connects between the leg portions 31b. As shown in FIG. 4, when the leg portions 31a are inserted into different slots 21 of the stator core 20, tips of the leg portions 31a protrude from the axial end surface 22 of the stator core 20. The protruding portions 32, which protrude from the axial end surface 22 of the stator core 20, are bent in the circumferential direction using the bending-forming jig 10. The tip portions 33 of the bent and formed protruding portions 32 are then connected by welding, thereby forming the stator coil 25 wound around the outer surface of teeth 24 between the slots 21 as shown in FIG. 4. In FIG. 4, reference numeral 37 indicates a welding portion.

Next, the step of bending and forming the protruding portions 32 of the U-shaped conductor 30 by means of the bending-forming jig 10 according to the embodiment will be described with reference to FIGS. 5 and 6. As shown in FIG. 5, the bending-forming step includes two steps: bending step and pressing step. The following description will be given assuming that a circumferential direction in which the protruding portions 32 are bent is a first circumferential direction, and that an opposite direction to the first circumferential direction is a second circumferential direction.

The bending-forming jig 10 is mounted on a bending processing apparatus (not shown) located above the axial end surface 22 of the stator core 20. The bending-forming jig 10 moves in the circumferential direction about an axially center line 26 of the stator core 20 (see FIG. 3) and also moves in the axial direction.

As shown in the bending steps (1) to (3) in FIG. 5, the bending processing apparatus causes the second abutting surface 16 of the bending-forming jig 10 to abut against the second circumferential direction side surface of the tip portion 33 of the protruding portion 32 to thereby allow the bending-forming jig 10 to rotate in the first circumferential direction and to move in the axial direction toward the stator core 20. Thus, the protruding portion 32 is bent in the first circumferential direction with point G1 in a root portion 34 as the bending start point.

The bending processing apparatus then moves the bending-forming jig 10 upward and rotates it in the first direction until an end portion on the second direction side of the projecting portion 15 becomes on the first circumferential direction side of the tip portion 33 of the protruding portion 32. After that, as shown in FIG. 6, the bending processing apparatus sets the position of the bending-forming jig 10 such that the axial end surface 12 of the ring portion 11 of the bending-forming jig 10 contacts an upper side portion 35 side of the tip portion 33 of the protruding portion 32, and such that the upper portion of the projecting portion 15 contacts the lower side of the tip portion 33 of the protruding portion 32.

The bending processing apparatus then moves the bending-forming jig 10 in the first circumferential direction again, while moving it in the axial direction toward the stator core 20. At this time, the bending processing apparatus moves the bending-forming jig 10 such that the bending-forming jig 10 presses the tip portion 33 of the protruding portion 32 in the second circumferential direction, and such that the distance L1 between the root portion 34 and the tip portion 33 of the protruding portion 32 at the start of the pressing step (1) becomes as short as the distance L2 at the end of the pressing step (2).

Figure 6:
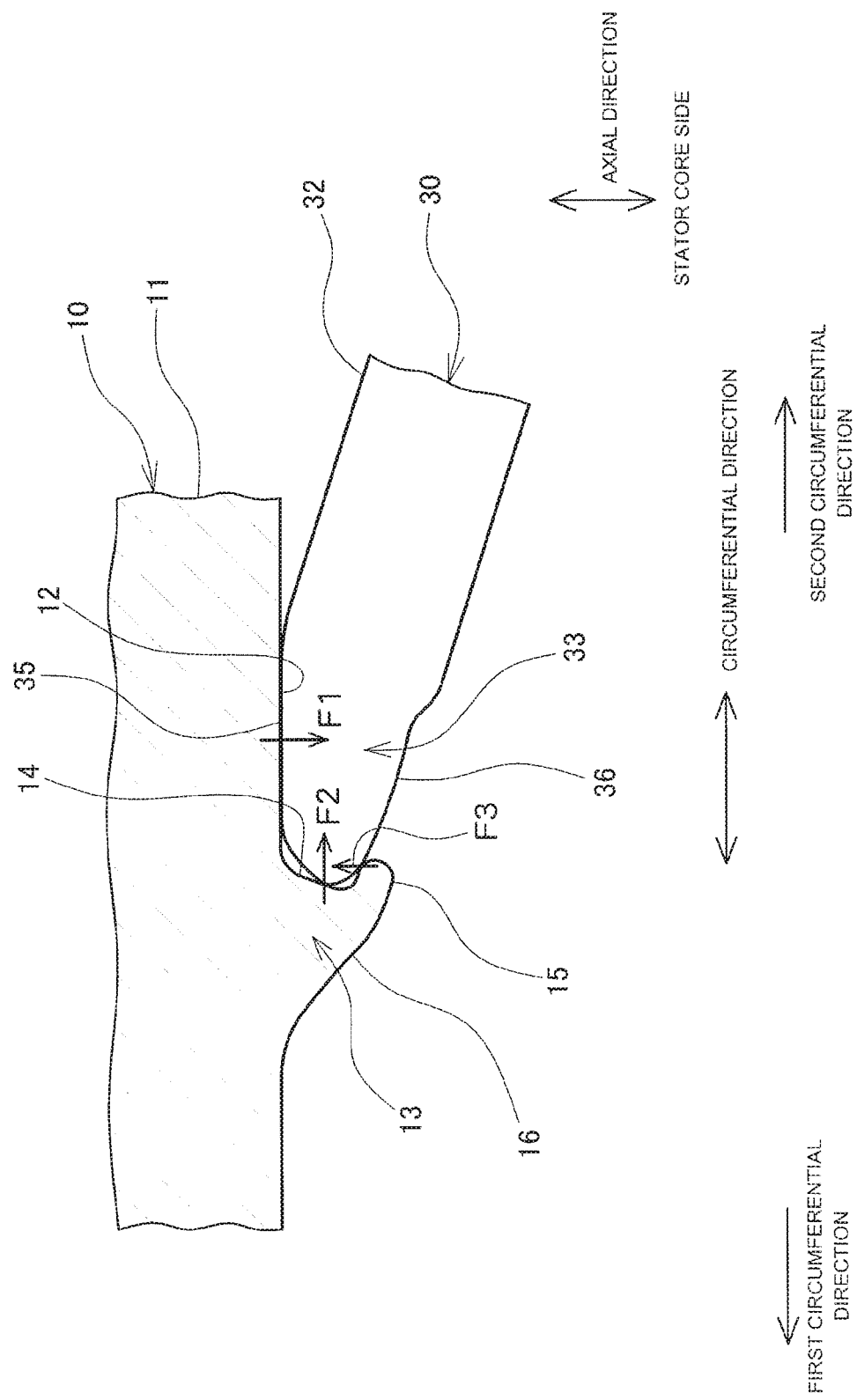
FIG. 6 is an enlarged view of the pressing step shown in FIG. 5.

As shown in FIG. 6, during the pressing step, the upper side portion 35 of the tip portion 33 of the protruding portion 32 is subjected to a load F1 in the axial direction from the axial end surface 12 of the ring portion 11 toward the stator core 20. In addition, an end portion on the first circumferential direction side of the tip portion 33 of the protruding portion 32 is subjected to a load F2 from the first abutting surface 14 toward the second circumferential direction. Further, the first circumferential direction side tip of a lower side portion 36 of the tip portion 33 of the protruding portion 32 is subjected to an upward load F3 from the projecting portion 15 toward the axial end surface 12 of the ring portion 11.

The load F1 further bends the protruding portion 32 toward the first circumferential direction. In addition, the load F2 adjusts the position of the tip portion 33 of the protruding portion 32 in the first circumferential direction. Further, the loads F1 and F3 act to sandwich the tip portion 33 of the protruding portion 32 between the axial end surface 12 of the ring portion 11 and the projecting portion 15, and to hold the relative positions of the upper side portion 35 of the tip portion 33 and the axial end surface 12 of the ring portion 11. The load F3 thus reduces the amount of bending deformation of the first circumferential direction side tip of the tip portion 33 toward the stator core 20 side and prevent the upper side portion 35 of the tip portion 33 from being inclined from the horizontal position.

Figure 7:
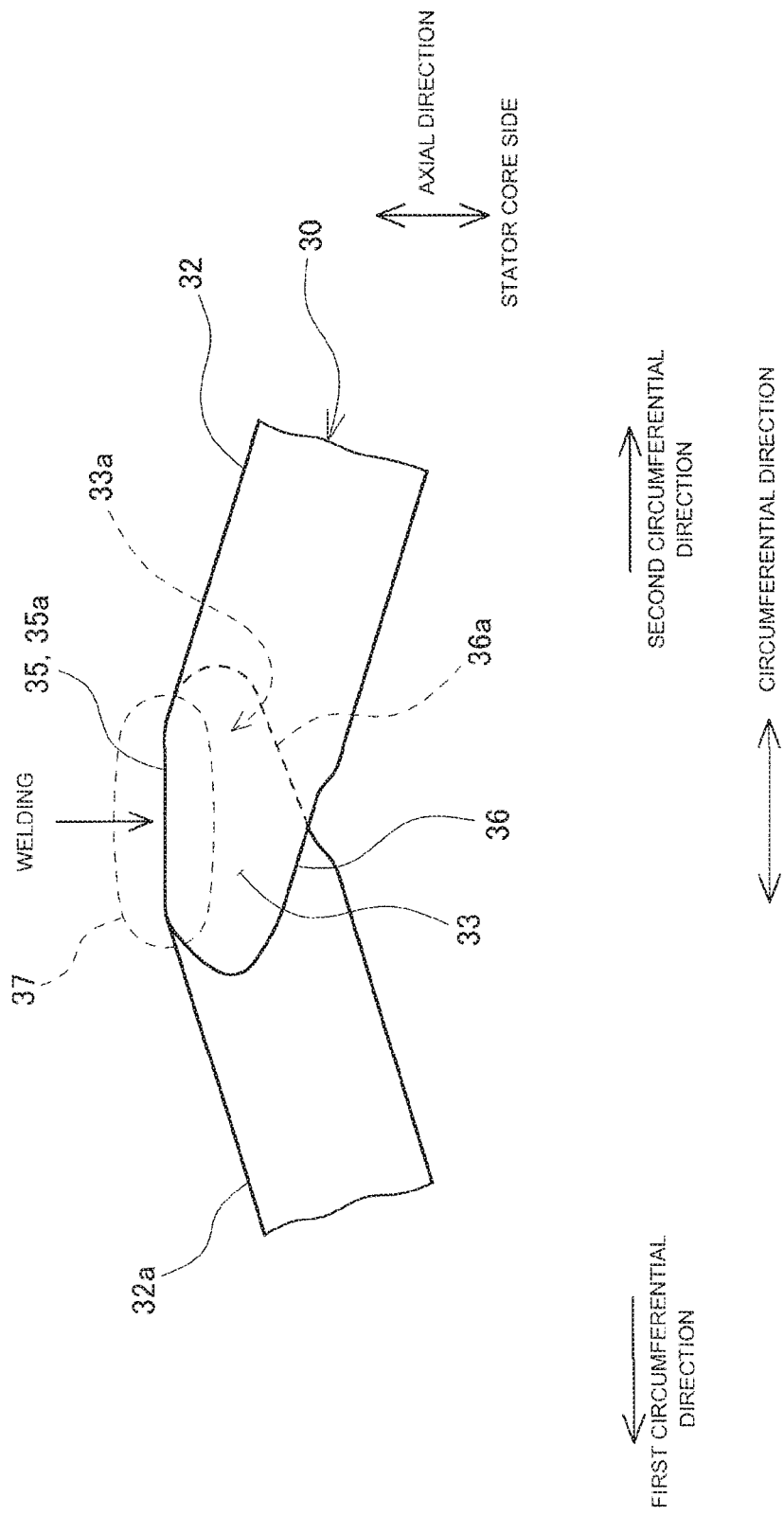
FIG. 7 is an elevation showing the tip portions of the radially adjacent U-shaped conductors overlapped with each other after the U-shaped conductors are bent and formed by means of the bending-forming jig according to the embodiment.

As shown in FIG. 7, when the bending-forming step is ended, the upper side portion 35 of the tip portion 33 becomes horizontal to an extent that does not affect laser welding. Therefore, when the tip portion 33 of the protruding portion 32 is radially overlapped with a tip portion 33a of a different, adjacent protruding portion 32a, the upper side portions 35 and 35a of the protruding portions 32 and 32a are both substantially horizontal. The upper side portions 35 and 35a of the protruding portions 32 and 32a thus have no step therebetween, and occurrence of problems, such as defocusing during laser welding, an unstable molten pool, and spatter generation by local heating, can be prevented. Thus, the suitable welding portion 37 can be formed.

Figure 8:
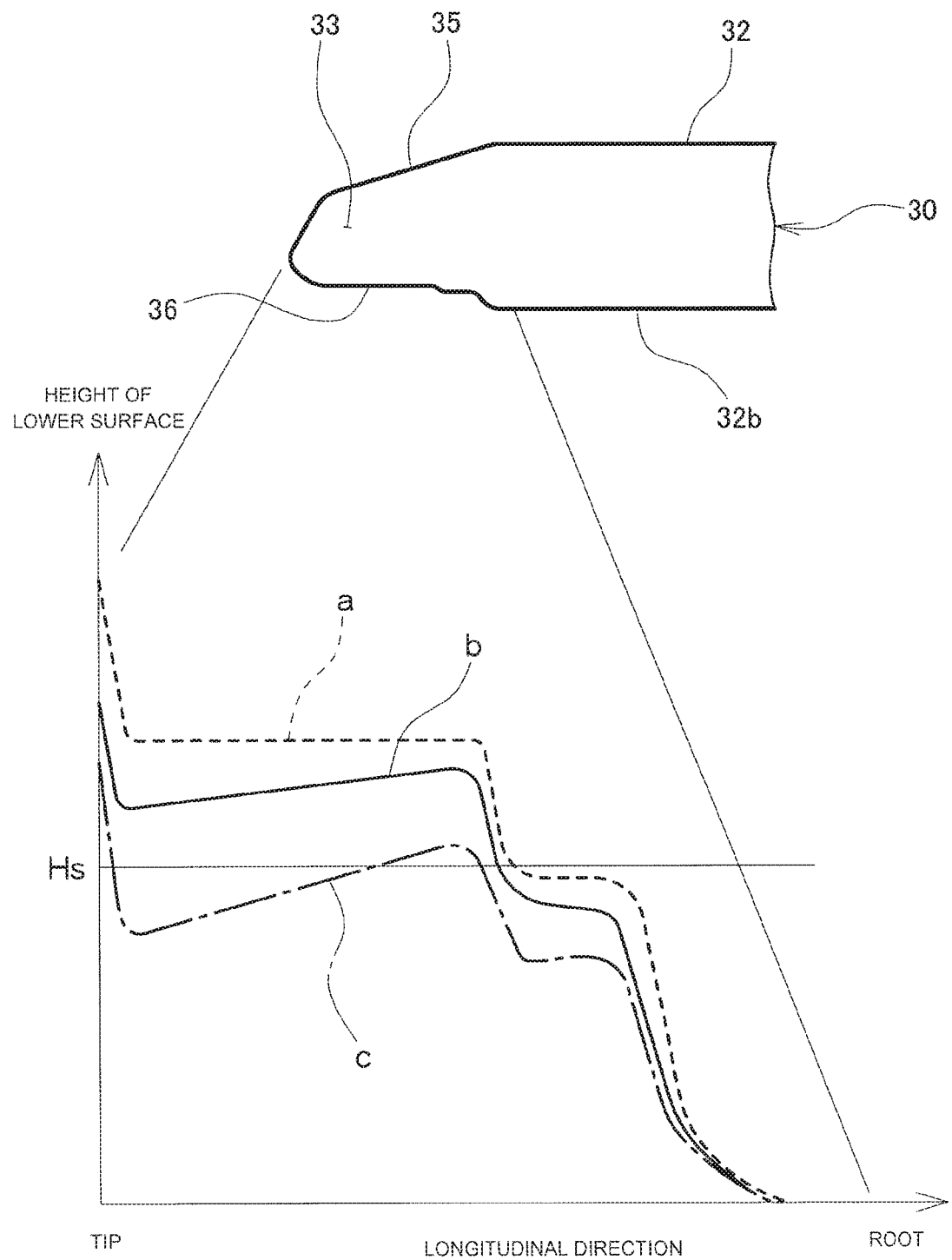
FIG. 8 is a graph showing changes in the shape of a lower side portion of the U-shaped conductor before and after bending and forming.

FIG. 8 is a diagram showing changes in height of the lower side portion 36 of the tip portion 33 with respect to the longitudinal direction using, as a reference, a lower surface 32b of a general portion of the protruding portion 32. In FIG. 8, the broken line a indicates changes in height of the lower side portion 36 before bending, while the solid line b indicates changes in height of the lower side portion 36 of the tip portion 33 after bending and forming the protruding portion 32 using the bending-forming jig 10 according to the embodiment. The dashed-dotted line c indicates changes in height of the lower side portion 36 of the tip portion 33 after the protruding portion 32 is bent and formed using a bending-forming jig 100 according to a comparative example described below. In FIG. 8, the higher height of the lower side portion 36 after bending and forming indicates the smaller amount of reduction in height of the lower side portion 36 as well as the smaller amount of bending of the tip portion 33 during bending and forming. The lower height of the lower side portion 36 after bending and forming indicates the larger amount of reduction in height of the lower side portion 36 as well as the larger amount of bending of the tip portion 33 during bending and forming.

In FIG. 8, the height Hs indicates the limit of change in height of the lower side portion 36 at which the levelness of the upper side portion 35 of the tip portion 33 after bending and forming does not affect welding. If, after bending, changes in height of the lower side portion 36 are lower than the height Hs, due to bending, the levelness of the upper side portion 35 varies to an extent that affects welding. Meanwhile, if changes in height of the lower side portion 36 are higher than the height Hs, the amount of bending is small, and the levelness of the upper side portion 35 varies within a range that does not affect welding.

As shown in FIG. 8, it is understood that when the protruding portion 32 is bent and formed by means of the bending-forming jig 10 according to the embodiment, the height of the lower side portion 36 after bending and forming is higher than Hs, and the levelness of the upper side portion 35 of the tip portion 33 after bending and forming is maintained to an extent that does not affect welding.

Figure 9:
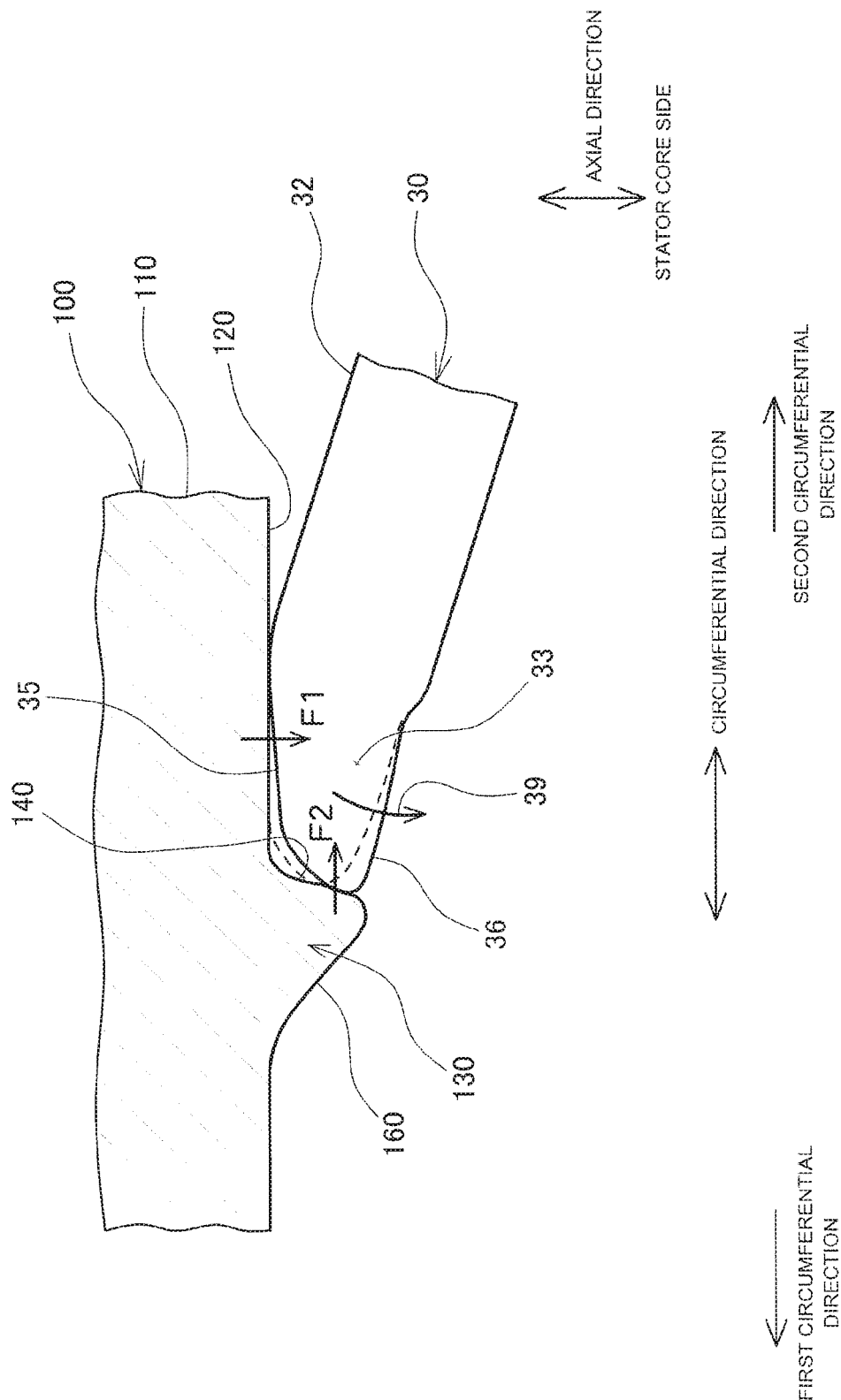
FIG. 9 shows the pressing step when the U-shaped conductor is bent and formed by means of a bending-forming jig according to a comparative example.

The case of bending and forming the protruding portion 32 by means of the bending-forming jig 100 of the comparative example will now be described. The description of the steps and actions that are similar to those in the case of using the bending-forming jig 10 according to the embodiment described above with reference to FIGS. 5 to 8 will be omitted. As shown in FIG. 9, the bending-forming jig 100 of the comparative example is obtained by eliminating the projecting portion 15 from the bending-forming jig 10 according to the embodiment described with reference to FIG. 6.

As shown in FIG. 9, the bending-forming jig 100 according to the comparative example has no projecting portion 15, and thus, the loads F1 and F2 applied to the tip portion 33 during the pressing step bend and deform the first circumferential direction side tip of the tip portion 33 to the stator core 20 side. Accordingly, the upper side portion 35 of the bent and formed tip portion 33 is inclined from the horizontal position. At this time, changes in height of the lower side portion 36 of the tip portion 33 are lower than the height Hs as indicated by the dashed-dotted line c in FIG. 8

Figure 10:
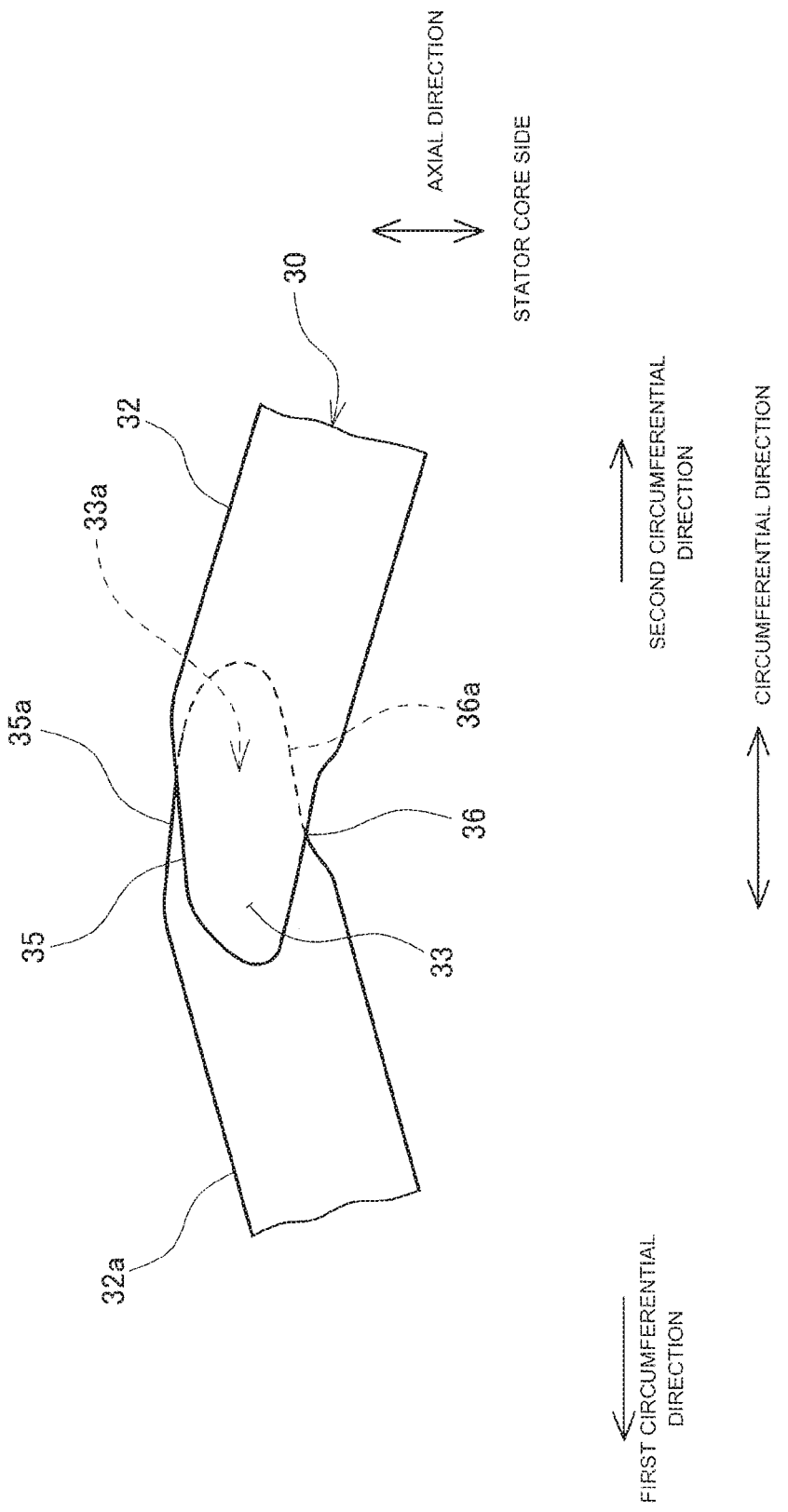
FIG. 10 is an elevation showing the tip portions of the radially adjacent U-shaped conductors overlapped with each other after the U-shaped conductors are bent and formed by means of the bending-forming jig according to the comparative example.

Accordingly, as shown in FIG. 10, when the tip portion 33 of the protruding portion 32 is radially overlapped with the tip portion 33a of the different, radially adjacent protruding portion 32a, the upper side portion 35 of the protruding portion 32 is inclined to the stator core 20 side toward the first circumferential direction, while the upper side portion 35a of the different protruding portion 32 is inclined to the stator core 20 side toward the second circumferential direction. The upper side portions 35 and 35a of the protruding parts 32 and 32a thus have a step therebetween, and defocusing during laser welding, an unstable molten pool, or spatter generation by local heating may occur.

As described above, the bending-forming jig 10 according to the embodiment can prevent the tip portions 33 from being bent when the protruding portions 32 of the U-shaped conductor inserted in the slots 21 of the stator core 20 are bent and formed. The bending-forming jig 10 according to the embodiment can also increase the amount of bending of the protruding portion 32 and prevent the tip portion 33 from being bent when the protruding portion 32 is bent and formed, thereby lowering the height of the tip portion 33 and lowering the height of the stator.

Bending-forming jigs 10a to 10c according to other embodiments will be described with reference to FIGS. 11 to 13. The description of the portions that are similar to those included in the bending-forming jig 10 according to the embodiment described above with reference to FIGS. 5 to 8 are assigned the same reference numerals, and their description will be omitted.

Figure 11:
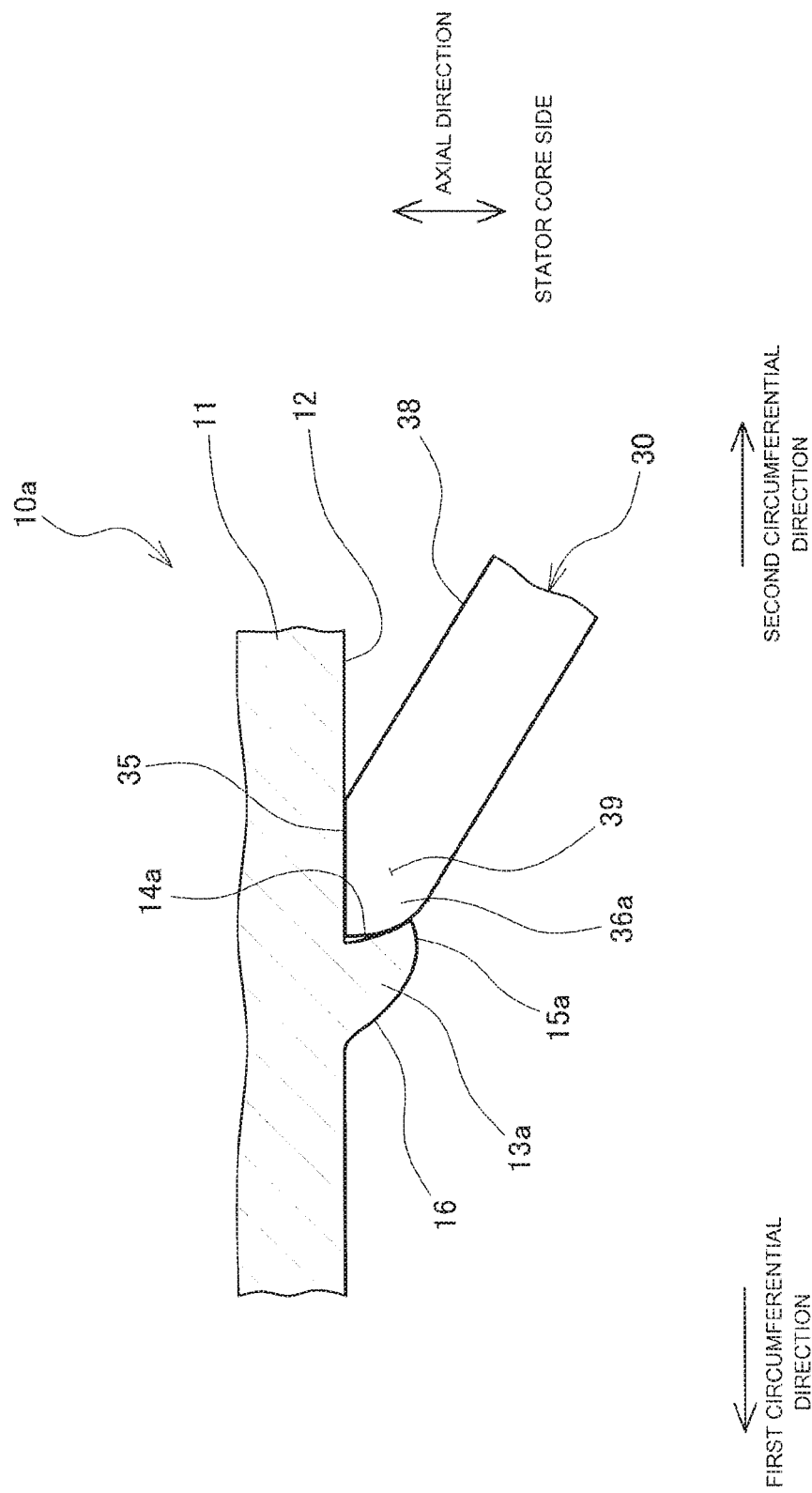
FIG. 11 shows a claw portion of a bending-forming jig according to another embodiment.

The bending-forming jig 10a shown in FIG. 11 has a pointed projecting portion 15a of a claw portion 13a and a first abutting surface 14a inclined to the second circumferential direction along the curved surface of a lower side portion 36a of a tip portion 39. The pointed projecting portion 15a and the tip end side of the first abutting surface 14a enter under the lower side portion 36a of the tip portion 39 of a protruding portion 38 to support the lower side of the lower side portion 36a.

Figure 12:
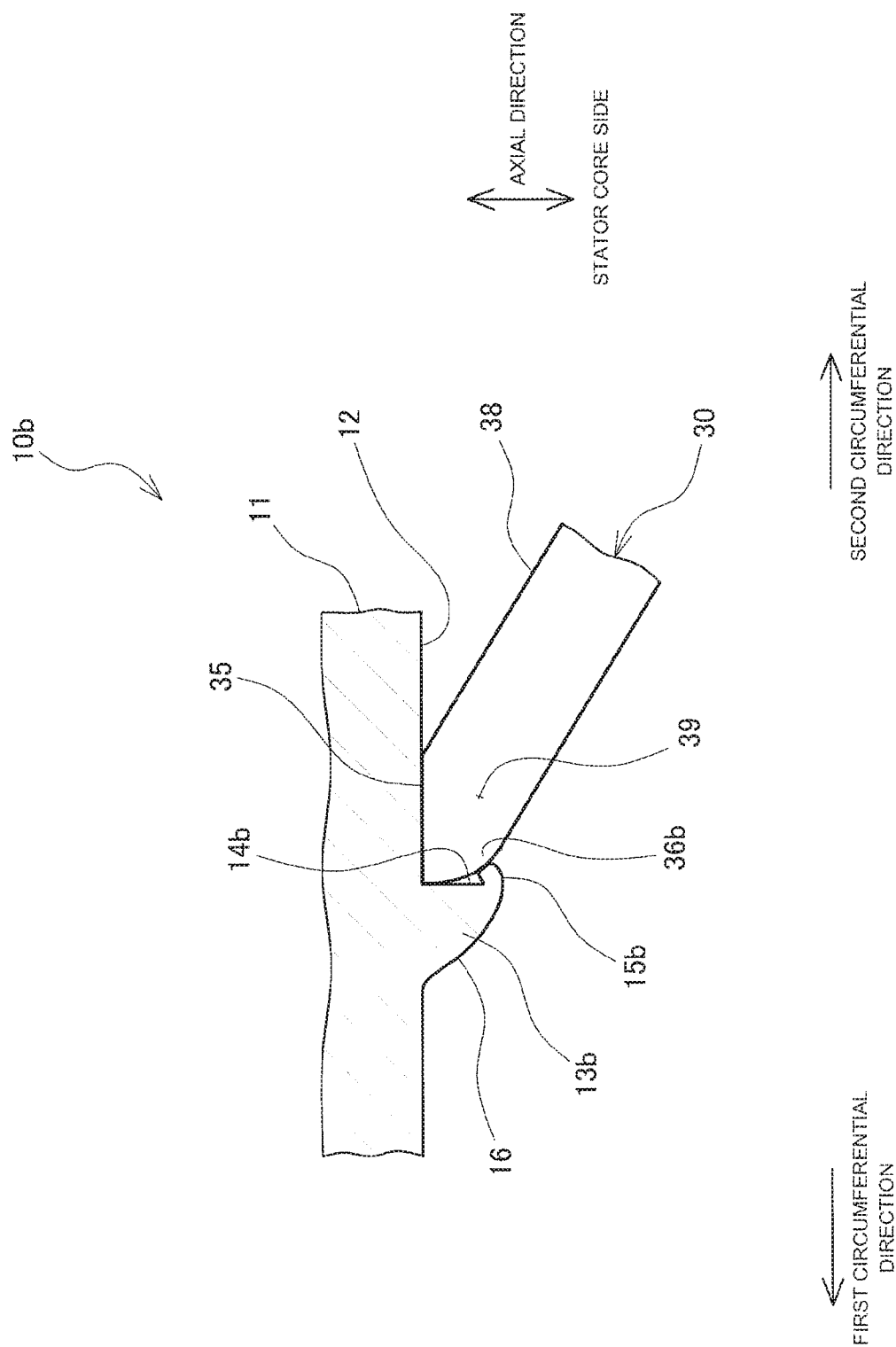
FIG. 12 shows a claw portion of a bending-forming jig according to another embodiment.

In addition, the bending-forming jig 10b shown in FIG. 12 has a first abutting surface 14b of a claw portion 13b rising perpendicularly to the axial end surface 12 of the ring portion 11 and a projecting portion 15b with a tip projecting in a direction perpendicular to the curved surface of a lower side portion 36b of the tip portion 39 of the protruding portion 38. Further, the bending-forming jig 10c shown in FIG. 13 has a first abutting surface 14c of a claw portion 13c rising perpendicularly to the axial end surface 12 of the ring portion 11 and a projecting portion 15c with a tip projecting along the curved surface of a lower side portion 36c of the tip portion 39 of the protruding portion 38 to support the bottom surface of the tip portion 39.

Figure 13:
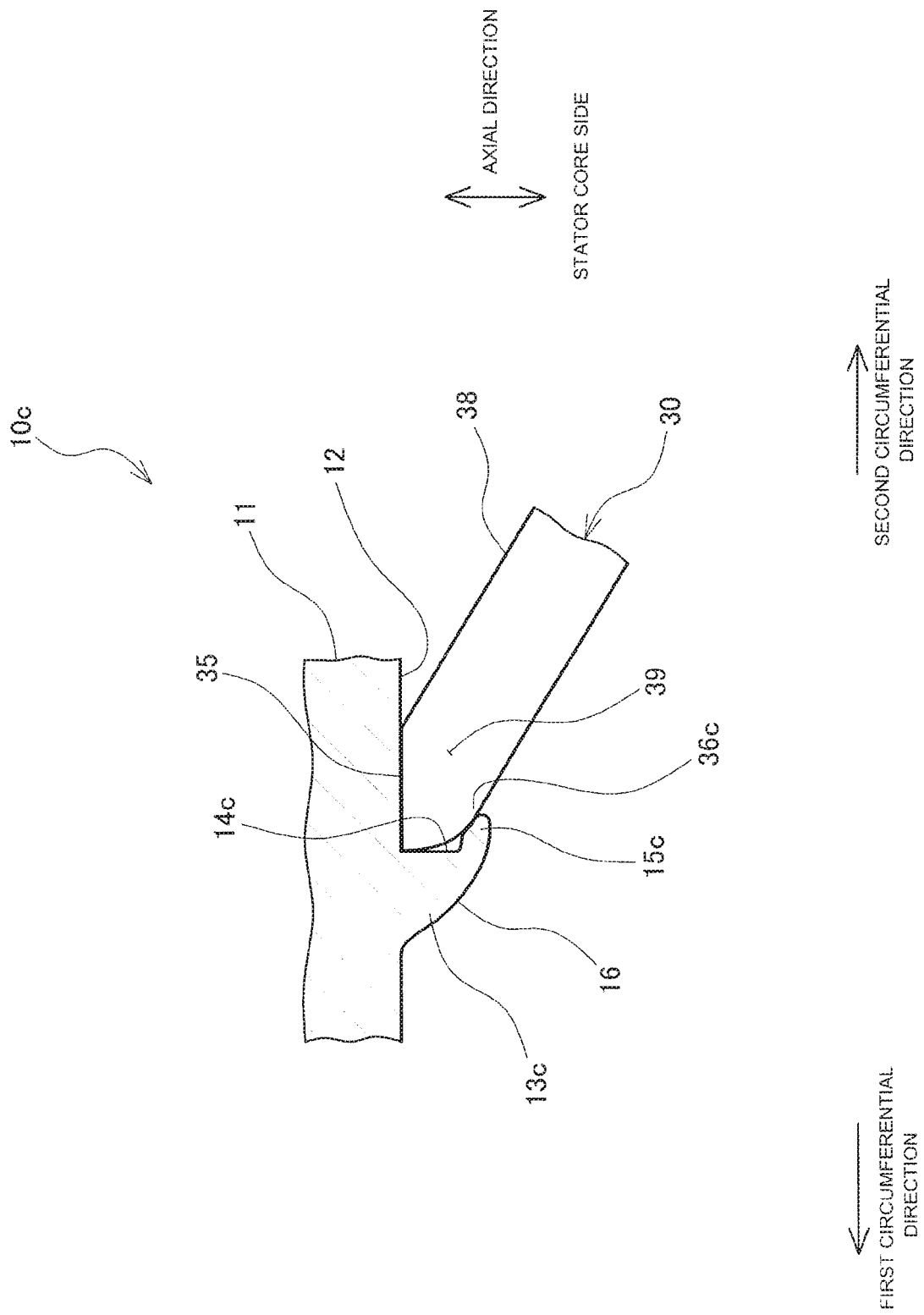
FIG. 13 shows a claw portion of a bending-forming jig according to another embodiment.

The bending-forming jigs 10a. 10b, and 10c shown in FIGS. 11 to 13 achieve similar functions and effects to those of the bending-forming jig 10.

The invention claimed is:

1. A bending-forming jig configured to bend and form a protruding portion of a leg portion of a U-shaped conductor in a circumferential direction, the U-shaped conductor inserted in slots of a stator core, the protruding portion protruding from an axial end surface of the stator core, the bending-forming jig comprising:
   an annular ring portion; and
   a claw portion that protrudes in the axial direction from an axial end surface of the ring portion, wherein
   the claw portion comprises
      a first abutting surface directed in the circumferential direction that rises in the axial direction from the axial end surface of the ring portion and is configured to abut against a tip portion of the protruding portion from the circumferential direction when the protruding portion is bent and formed, and
   a projecting portion that projects, at a tip end of the claw portion, in the circumferential direction from the first abutting surface and is configured to abut against the tip portion of the protruding portion from the axial direction toward the axial end surface of the ring portion when the protruding portion is bent and formed.

2. The bending-forming jig according to claim 1, wherein the claw portion further comprises a second abutting surface disposed on an opposite side of the first abutting surface, in the circumferential direction, and which is configured to abut against the tip portion of the protruding portion from the circumferential direction when the protruding portion is bent and formed.

3. The bending-forming jig according to claim 1, wherein the first abutting surface is inclined in the circumferential direction.

4. The bending-forming jig according to claim 1, wherein the first abutting surface rises perpendicularly in the axial direction from the axial end surface of the ring portion.

* * * * *